Sept. 4, 1962 J. S. KESSLER 3,052,445
PLUG FOR PLUG VALVE
Filed Dec. 14, 1959 2 Sheets-Sheet 1

INVENTOR.
JOSEPH S. KESSLER
BY
John W. Michael
ATTORNEY

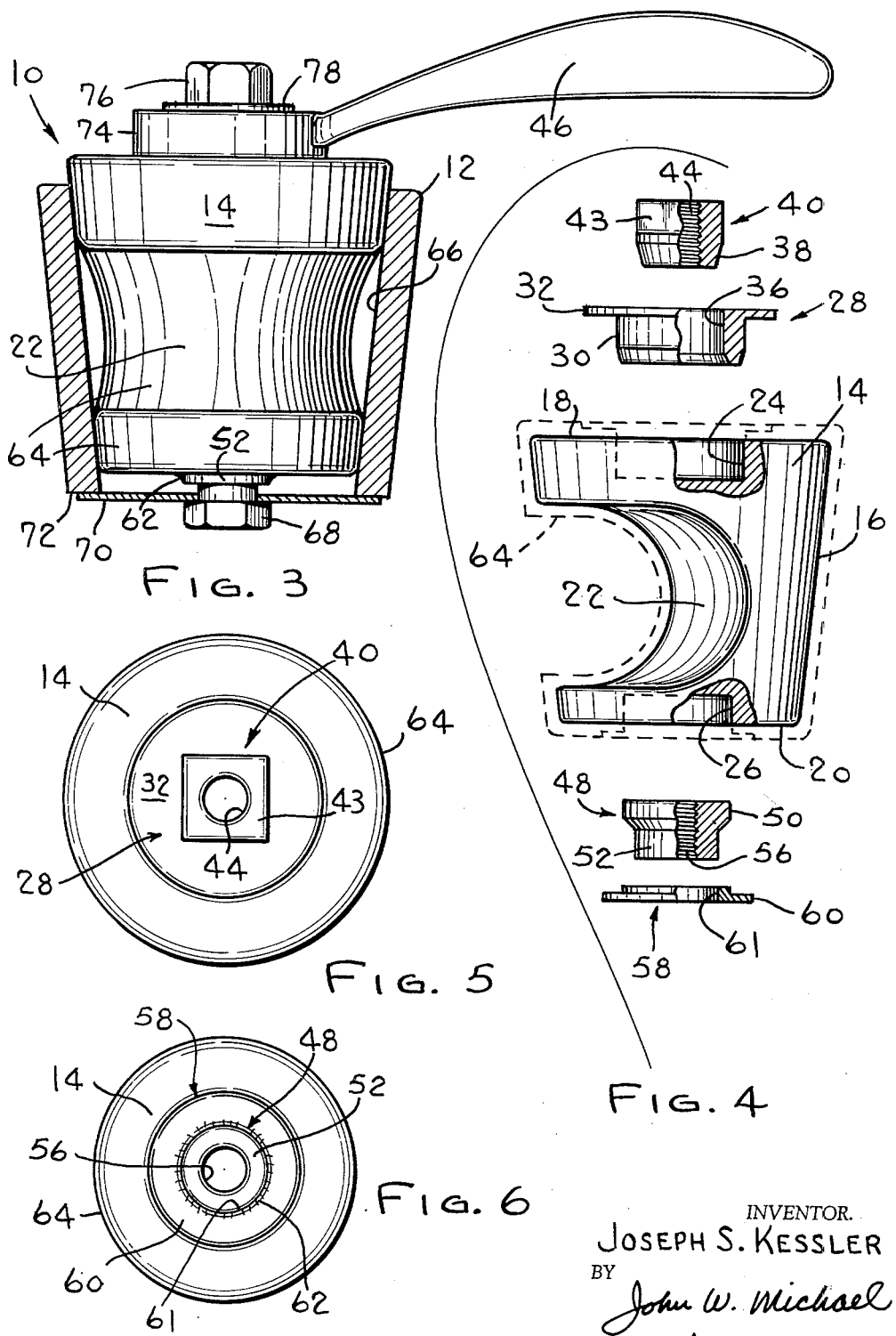

United States Patent Office 3,052,445
Patented Sept. 4, 1962

3,052,445
PLUG FOR PLUG VALVE
Joseph S. Kessler, Kenosha, Wis., assignor to G & H Products Corporation, Kenosha, Wis., a corporation of Wisconsin
Filed Dec. 14, 1959, Ser. No. 859,235
9 Claims. (Cl. 251—309)

This invention relates generally to valves and more particularly to an improved rubber coated plug cock for a plug valve designed for handling food products such as milk and other dairy products.

Due to problems of corrosion and sanitation, fittings, pipe, valves, etc. used for handling food products are generally made from stainless steel. It has been found, however, that in certain applications such as plug valves severe galling occurs at the cock making stainless steel unsuitable for such use. The industry has adopted rubber coated parts to alleviate this problem.

It is the object of this invention to provide an improved rubber coated plug cock for a plug valve which is relatively inexpensive to manufacture and yet will have a long service life when used in handling food products.

Another object is to provide a plug valve having a rubber coated plug cock and stainless steel end fittings which cooperate to provide maximum protection to the valve as a whole.

The objects of this invention are attained by a plug cock for a plug valve comprising a body having a conical side wall and flat end walls. The body is coated with a corrosion resistant material such as rubber and is provided with stainless steel end fittings designed for mounting an actuating handle on the cock and for mounting the coated plug cock in a valve body.

The end fittings for mounting the handle on the cock include a flanged member having a flange spaced from the end wall of the body and adapted for flush sealing engagement with the rubber coating which extends underneath the flange. The handle is tightened into engagement with the metal face of the flange to thus avoid the possibility of damage to the rubber coating by repeated assembly and disassembly of the parts.

The fittings mounted on the other end of the cock for mounting the cock in a valve body include a second flanged member having a flange which cooperates with the rubber coating in much the same manner as on the top of the plug.

In addition to the flanged fittings mounted on the ends of the cock, I provide a pair of threaded fittings mounted on the flanged members and adapted for threaded engagement with machine screws used in the final assembly of the plug cock in the valve body. With the above arrangement the plug cock when assembled is completely encased with a covering of corrosion resistant material resulting in a long service life.

Other objects and advantages will be pointed out in, or be apparent from the specification and claims, as will obvious modifications of the single embodiment shown in the drawings, in which:

FIG. 3 is a sectional view taken along line 3—3 of FIG. 1;

FIG. 4 is an exploded view (with parts broken away) of the plug cock and end fittings; and FIGS. 5 and 6 are top and bottom plan views, respectively, of the assembled plug cock before installation in a valve body.

Figure 1:
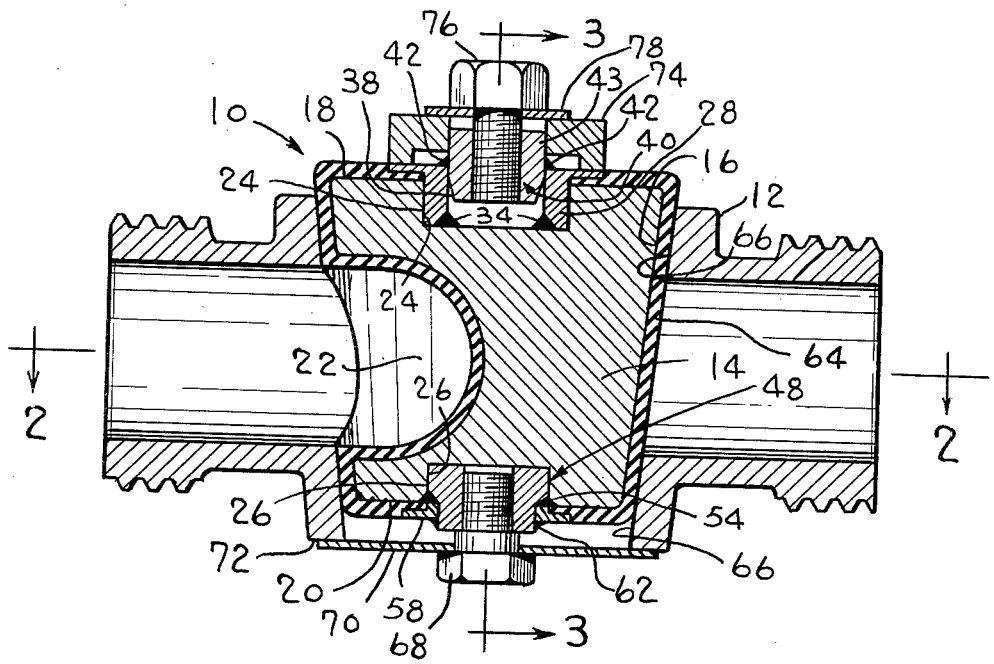
FIG. 1 is a sectional view of a plug valve having a plug cock embodying my invention.
Figure 2:
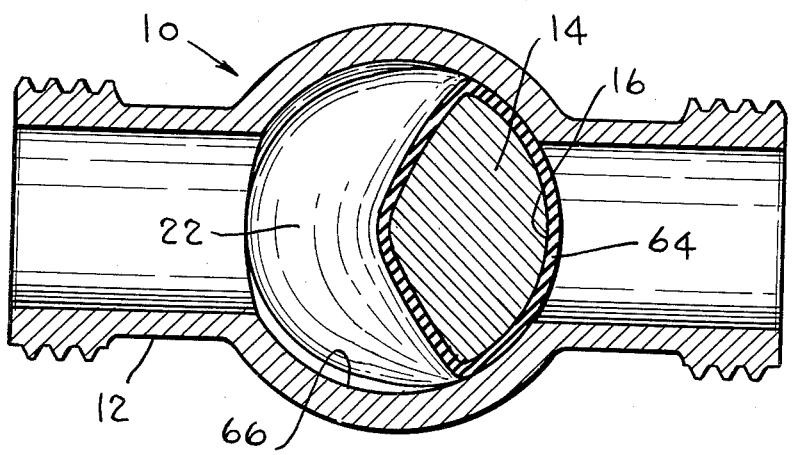
FIG. 2 is a sectional view taken along line 2—2 of FIG. 1.

Referring now to the drawings in detail, FIG. 1 shows a plug cock 10 embodying the features of this invention mounted in a stainless steel valve body 12 of conventional design. Cock 10 is made from a body 14 of substantially frusto-conical shape having a conical side wall 16 and flat end walls 18, 20 (FIG. 4). A flow passageway 22 is formed in side wall 16 and a pair of cylindrical recesses 24, 26 are drilled or otherwise formed in end walls 18 and 20, respectively.

The next step in the manufacture of the plug cock is the installation of the end fittings shown individually in FIG. 4. First a flanged fitting 28 having a body 30 and a flange 32 is inserted in recess 24 and welded to cock body 14 by a weld 34 (FIG. 1). With fitting 28 thus installed it will be noted that the underside of flange 32 will be spaced a short distance from top end face 18. Fitting 28 has a bore 36 in which the round tapered end portion 38 of a threaded plug member 40 is inserted and welded as at 42 (FIG. 1). Member 40 has a square body portion 43 and a threaded bore 44 for mounting a valve handle 46 (FIG. 3) as will be discussed in more detail hereinafter.

Turning now to the bottom of plug body 14, a threaded fitting 48 having a body 50 which tapers to an end portion 52 of reduced diameter is inserted in recess 26 and fastened therein by a weld 54. As will be presently explained, fitting 48 has a threaded bore 56 utilized for securely mounting the plug cock in the valve body. Next a washer-like flanged fitting 58 having a flange 60 and a central bore 61 is slipped over end portion 52 of fitting 48 and welded thereto by a weld 62 as shown in FIG. 1. As in the case of flange 32 described above, the underside of flange 60 on member 58 is spaced a short distance from bottom end face 20 of the cock body.

With fittings 28, 40, 48 and 58 assembled as described above, the entire assembly is then coated with a layer 64 of resilient material. Coating 64 is preferably applied by a molding process and covers the entire side wall 16 and flow passageway 22 of body 14. The coating extends around the edges of the body and covers the exposed portions of end faces 18 and 20 flush with the faces of flanges 32 and 60 on fittings 28 and 58, respectively. To insure a good seal between the coating and the end fittings, the coating is extended all the way up to the edges of recesses 24 and 26 underneath flanges 32 and 60. Thus, it is seen that except for threaded bores 44 and 56 the entire surface of cock 10 is covered with corrosive resistant material.

Body 14 is preferably made from brass which is relatively inexpensive, easy to machine, and provides a base to which the coating 64 will adhere very well. As previously mentioned, the end fittings are made from stainless steel for its corrosion resistant properties. Similarly, coating 64 is made from a material which will withstand the corrosive effects of food products such as milk. Rubber, both natural and synthetic, has proven satisfactory for the coating.

To complete the valve assembly, the rubber coated cock 10 is mounted in a conical valve seat 66 of body 12 by a machine screw 68 tightened against a washer member 70 which engages the bottom face 72 of the body as shown in FIG. 1. To actuate cock 10 for controlling flow through the valve, a handle 46 having a base portion 74 is mounted on the top of the cock by a machine screw 76 and a washer 78 as shown. Thus, it is seen that when the valve is completely assembled for use (FIG. 1), threaded bores 44 and 56 are sealed by screws 76 and 68, respectively, to thereby completely encase the cock with corrosion resistant material. Furthermore, it is noted that with handle 46 installed on cock 10 the base 74 of the handle is tightened into engagement with the metal face of flange 22 on fitting 28 to thus avoid the possibility of damage to rubber coating 64 by repeated assembly and disassembly of the parts for cleaning and inspection.

Although but one embodiment of the present invention has been illustrated and described, it will be apparent to those skilled in the art that various changes and modifications may be made therein without departing from the spirit of the invention or from the scope of the appended claims.

I claim:

1. A plug cock for a plug valve comprising, a body having a conical side wall and flat end walls, a coating of resilient material on said body, an actuating handle for the cock, first fitting means mounted in one end wall adapted for mounting said actuating handle thereon, second fitting means mounted on the other end wall adapted for mounting the cock in a valve, said first fitting means including a flanged member having a flange spaced outwardly from said one end wall, the inner surface of said flange in permanent sealing engagement with said coating of resilient material which extends underneath said flange, the outer surface of said flange in metal-to-metal engagement with the base of said handle when said handle is fastened to said cock.

2. A plug cock according to claim 1 in which said first fitting means is further characterized by a bore in said flanged member and a threaded member mounted in said bore and welded to said flanged member, said threaded member having an internally threaded bore adapted for threaded engagement with a machine screw which serves to fasten said handle on the cock.

3. A plug cock according to claim 1 in which said second fitting means includes a flanged member having a flange, the inner surface of said flange in permanent sealing engagement with said coating with said coating extending underneath said flange.

4. A plug cock according to claim 3 in which said second fitting means further includes a threaded member welded to said body and having an internally threaded bore adapted for threaded engagement with a machine screw which serves to hold the cock securely in place in a valve.

5. A plug cock according to claim 4 in which said flanged member of said second fitting means has a central bore so that it can be slipped over the end of said threaded member and welded thereto.

6. A plug cock for a plug valve comprising, a body having a conical side wall and flat end walls, a recess formed in each of said end walls, a coating of resilient material on said body, an actuating handle for the cock, a first fitting means mounted on one end wall and adapted for mounting said actuating handle thereon, said first fitting means including a first flanged member fitted in said recess in said one wall and welded to said body, said first flanged member having a flange thereon spaced from said one end wall, the inner surface of said flange in permanent sealing engagement with said coating of resilient material which extends underneath said flange, the outer surface of said flange in metal-to-metal engagement with the base of said handle when said handle is fastened to said cock, and second fitting means mounted on the other end wall adapted for mounting the cock in a valve, said second fitting means including a second flanged member having a flange, the inner surface of said flange in permanent sealing engagement with said coating extending underneath said flange.

7. A plug cock according to claim 6 in which said second fitting means further includes a threaded member inserted in the recess in said other wall and welded to said body, said threaded member having an internally threaded bore adapted for threaded engagement with a machine screw which serves to hold the cock securely in place in a valve.

8. A plug cock according to claim 7 in which said second flanged member of said second fitting means has a central bore so that it can be slipped over the end of said threaded member and welded thereto.

9. A plug cock according to claim 6 in which said first fitting means is further characterized by a bore in said first flanged member, and a threaded member mounted in said bore and welded to said flanged member, said threaded member having an internally threaded bore adapted for threaded engagement with a machine screw which serves to fasten said handle on the cock.

References Cited in the file of this patent

UNITED STATES PATENTS

| | | |
|---|---|---|
| 2,027,859 | Cohen | Jan. 14, 1936 |
| 2,172,592 | Podolsky | Sept. 12, 1939 |
| 2,832,563 | Walsh | Apr. 29, 1958 |
| 2,864,579 | Stoltenberg | Dec. 16, 1958 |